(12) United States Patent
Hartman (10) Patent No.: US 8,090,595 B2
(45) Date of Patent: Jan. 3, 2012

(54) SYSTEM AND METHOD FOR ANALYZING AND IMPROVING BUSINESS PERFORMANCE

(76) Inventor: John W Hartman, Green Bay, WI (US)

( * ) Notice: Subject to any disclaimer, the term of this patent is extended or adjusted under 35 U.S.C. 154(b) by 1649 days.

(21) Appl. No.: 10/904,969

(22) Filed: Dec. 7, 2004

(65) Prior Publication Data

US 2005/0171801 A1 Aug. 4, 2005

Related U.S. Application Data

(60) Provisional application No. 60/481,992, filed on Feb. 2, 2004.

(51) Int. Cl.
*G06Q 10/00* (2006.01)
(52) U.S. Cl. ............... 705/3; 705/7.29; 705/2
(58) Field of Classification Search .......... 705/1, 2, 705/7, 10, 7.29, 3, 400
See application file for complete search history.

(56) References Cited

U.S. PATENT DOCUMENTS

| | | | |
|---|---|---|---|
| 5,826,239 A * | 10/1998 | Du et al. | 705/8 |
| 6,098,047 A * | 8/2000 | Oku et al. | 705/7 |
| 7,725,429 B2 * | 5/2010 | Rangadass | 707/600 |
| 2001/0032195 A1 * | 10/2001 | Graichen et al. | 705/400 |
| 2002/0022971 A1 * | 2/2002 | Tanaka et al. | 705/1 |
| 2003/0018506 A1 * | 1/2003 | McLean et al. | 705/7 |
| 2003/0083901 A1 * | 5/2003 | Bosch et al. | 705/2 |
| 2005/0171801 A1 * | 8/2005 | Hartman | 705/1 |
| 2005/0203771 A1 * | 9/2005 | Achan | 705/2 |

* cited by examiner

*Primary Examiner* — Beth V Boswell
*Assistant Examiner* — Ernest A Jackson
(74) *Attorney, Agent, or Firm* — John K McCormick (57) ABSTRACT

The invention describes a system and methods for analyzing and improving business operations. The system includes a plurality of business operations databases that contains a plurality of operational data obtained from a plurality of business organizations. The system provides for flexible user defined input and output of data and information flows that contribute to improving the operational effectiveness and productivity of a business entity. One method defines the process for identifying, analyzing and selecting the existing business process databases and information flows for performance, productivity, cost and organizational improvement. The other method includes the steps of gathering, storing and outputting a plurality of operational data obtained from a plurality of businesses in a flexible and confidential manner for each business entity. This method also includes the de-identifying of the database for a variety of secondary purposes, including research and development.

3 Claims, 7 Drawing Sheets

Clarity™   Treatment Flow Sheet

Mary T Forthering
SSN: 222-22-2222
DOB: 07/15/1930

Report Date: 1/20/2004

Set Up
Treatment Date  ___________
Station / Machine #  ___________
Conductivity / PH  ___________
Temperature  ___________
Alarms Passed   Yes   No

Prescription                                       Weights
Duration       3.00 hrs                        Dry Weight   108.8 Lbs
Bath           2.0 K  2.5 Ca  35 HCO3          Last          108.2 Lbs
BFR/DFR        350/500                         Pre          ___________
Membrane       PR17                            Gain         ___________
Access         Right Internal Jugular - Perm Catheter   Goal   ___________
                                               Post         ___________

Na / UF Profile   Na:Standard
                  UF:Standard

Allergies: Compazine, Demerol, Furosemide, Penicillin, Phenergan

Pharmacy:

Medications                                   ICD-9      Time     Initials
Heparin       4000 u at start, 1500u/hr x 2 hours
Epogen        1000 u 3 x wk
Zemplar       8mcg q tx Alerts:

Pre - Dialysis                Post - Dialysis                Disposition
Start Time  ___ AM PM            Stop Time  ___ AM PM                Stable   Admit
Temp        ___                  Temp       ___
Sit BP      ___  PR ___          Sit BP     ___  PR ___              Time  ___
Stand BP    ___  PR ___          Stand BP   ___  PR ___
Heart    WNL  See Notes
Lungs    WNL  See Notes          Access  WNL  See Notes  Dressing Chg
Edema    WNL  See Notes

| Date | Last Tx | Pre Tx | Gain | Removed | End Weight | Start BP | End BP | High BP | Low BP | Pulse |
|---|---|---|---|---|---|---|---|---|---|---|
| 11/21/2003 | 107.8 | 110.0 | 2.2 | 1.8 | 108.2 | 181/82 | 169/85 | 181/82 | 147/70 | 51 - 69 |
| 11/19/2003 | 107.8 | 109.4 | 1.6 | 1.6 | 107.8 | 150/75 | 140/65 | 150/75 | 133/62 | 55 - 68 |
| 11/17/2003 | 106.4 | 108.8 | 2.4 | 1.0 | 107.8 | 147/75 | 127/56 | 147/75 | 105/61 | 56 - 81 |
| 11/14/2003 | 107.4 | 107.0 | -0.4 | 0.6 | 106.4 | 128/63 | 128/62 | 128/65 | 105/58 | 55 - 70 |

Page 1 www.Visonex.com        General Dialysis Centers - Lakeland Unit

FIG. 5

| Clarity™ | Multidisciplinary Care Report |

May Review

.lary T. Forthering
DOB: 7/11/1920
Patient ID: 123-45-6789

Main Street Clinic
General Dialysis Centers

Summary Information

Medications
Administered
  Epogen 2700u IV 3x/wk
  Venofer 100mg IV Qwk x 10wks

Phosphate Binders
  Renagel 3 (800mg) PO TID with meals
  Phoslo 2 PO TID with meals

New
  Coumadin 4mg PO QD
  Cardiazem 240mg PO QD
  Digoxin 0.125mg PO QMWF

Laboratories
| URR | 72 | Albumin | 3.8 | Potassium | 5.6 | Last PTH | 57 | 03/08/03 |
| KtV | 1.43 | Calcium (corr) | 9.2 | Hemoglobin | 11.2 | Last Iron Sat | 12% | 03/08/03 |
| PNA | 0.90 | Phosphorous | 6.1 | Hematocrit | 33.8 | Last Ferritin | 120 | 03/08/03 |
| PreBUN | 62 | | | | | Last Total Chol | 87 | 01/08/03 |

Recent Tests
  Chest Xray 04/22/03
  ECG 04/22/03
  Echo 04/24/03

Recent Hospitalizations
  04/22/03 - 05/01/03  Atrial Fibrillation

Transplant Status
  Ineligible - Renal Cell Cancer

Hemodialysis Prescription
  2.0 K  2.5 Ca  30 HCO3
  4 Hours
  PR 17
  BFR 350
  DFR 500
  Dry Weight 137 lbs

Access
  Perm Catheter - Rt Internal Jugular
  Placed 10/07/02
  Average BFR - 285

Hemodynamic
  Avg High BP 167/82
  Avg Low BP 113/62
  Avg BP 139/74
  Avg Wt Gain 2.3 lbs/dy
  Last Weight 135 lbs

Systematic Review

Adequacy
  Expected Outcome
    Maintain adequate clearance (URR > 67 or KtV > 1.2) and a functioning access
  Assessment
    Meets Adequacy Goal
    Has Functioning Access
  Plan/Intervention/Comments
  ______________________________
  ______________________________
  ______________________________

Anemia/Iron Deficiency
  Expected Outcome
    Meet hemoglobin goals while maintaining adequate iron stores   Hgb goal 11 - 12
  Assessment
    Meets Hemoglobin goal
    Low Iron stores - On Venofer 100mg IV Qwk x 10 wks
  Plan/Intervention/Comments
  ______________________________
  ______________________________
  ______________________________

Renal Osteodystrophy
  Expected Outcome
    Controlled metabolic parameters of renal Osteodystrophy (Ca < 10.2, PO4 < 5.5, Ca x PO4 < 65, PTH 150 - 300)
  Assessment
    Meets Calcium Goal, Meets Calcium-Phosphorous Product Goal
    Hyperphosphatemia - Consider Increase Binders
    Low PTH - Consider Stop Calcium Containing Binders
  Plan/Intervention/Comments
  ______________________________
  ______________________________

SYSTEM AND METHOD FOR ANALYZING AND IMPROVING BUSINESS PERFORMANCE

CROSS-REFERENCE TO RELATED APPLICATIONS

This application claims the benefit of U.S. provisional patent application Ser. No. 60/481,992 filed Feb. 2, 2004, the entire contents of which are incorporated herein by reference.

BACKGROUND OF THE INVENTION

The advent of affordable computer information systems, and improvements in software and technology, has lead to many improvements and gains in business and society over the last 30 years. Those entities that were created as a result of these technology advances have probably gained the most from it, as they were developed and grew up within the new technology framework. However, many other entities existed prior to the advent of these new technologies and have had to redefine their business needs and processes in order to adapt these new technologies into their existing business. This has created many improvements, but has also created many new problems and constraints as well.

The health care industry is a prime example of a pre-computer industry, although not the only industry, that has worked diligently to add new technology into existing business structures and processing methods in order to gain improvements and efficiencies. For explanation purposes, the health care industry, and more specifically the dialysis clinics, will be used as an example of this technology transition in order to aid comprehension of the background of this invention. The use of this example is not meant to limit the scope of the background or of the invention to the health care field or to dialysis clinics, but rather to aid in the understanding of the invention.

For the most part, the health care industry is an information based business that focuses on two primary activities. One activity is the care and assistance of patient's health care needs and the other is the generation of profits. In order to properly care for and treat a patient, a lot of information is required to be promptly available for review by the health care team. This information can be broken down into two main categories. The first category of information is more static in nature. This includes data like the patient's name, address, telephone number, insurance carrier, place of employment and so on. This is information about a patient that usually does not change often or with great frequency. The other category of information is more dynamic. This category includes such things as the patient's past and current medical history, current symptoms, laboratory test results, current medications, the nurse's review prior to the attending physicians visit, the prescribed treatment and a host of other variable data.

In the pre-computer era, all of the patient's static and dynamic information and data was manually created, recorded and filed in a chart, usually designated by the patient's name. This data and information file has two primary functions. The first function is to enable the attending physician to review data and assists in properly diagnosis and prescribing treatment for the patient. The chart also assists the nurses in administering the treatment correctly by aiding in communicating the physician's orders. In short, one primary function of the chart is for communication among the health care team. The second function is as a medical/legal record. This record allows for the proof of delivery when billing for the medical services and supplies provided. It also provides a legal record in case of a law suit. With this record, a health care entity can prove in court what they did, when they did it and who did it.

A patient's chart is considered the primary source for all of the information necessary to treat the patient and to provide for the business issues of billing and maintaining legal documentation. A patient's chart contain tabbed separators that include such sections as demographics and insurance information, doctor's notes and progress, vascular access, medication records, lab results, problem lists, dietary notes, and a host of other possible categorizations. In this manner, the treating health care professionals are able to access the information about a patient that they require by going to the tabbed section of the patient's chart and reviewing the information contained therein. However, health care has become more specialized and a greater variety of information has become available. This has resulted in more sources of information and more possible categorizations. The advent of the computer and its ability to efficiently track and report out information has exacerbated this situation as the reporting of information from each source has become more detailed and comprehensive. Currently, a patient's chart is not the only source of information on a patient, nor is it even a complete medical record. If a patient's consulting physician has prescribed other medications or treatments, that information may not be included in the primary physician's patient chart. Similarly, if the patient has visited a different source of care, such as a hospital or another physician's office, that information and the results from the visit may be lacking as well. By the same token, a hospital's or consulting physician's patient records may lack information present in the primary physician's patient chart. As a result, these multiple patient charts may have redundancies as well as missing information between the charts. This has resulted in a breakdown of the communication function of the chart, and its primary function has become that of an event log to prove what a specific health care team has done for billing and legal reasons.

A dialysis clinic is a specialized outpatient clinic and for the reasons above a patient's dialysis chart is not the only record of the patient's information. Typically, in order to be more productive, reduce costs, and to assure the proper care of the patient, health care teams will create information, work practices, and systems that enable them to do their jobs more effectively. For example, nurses often create a summary sheet, or listing, for all of their patient's medications that are to be given during the dialysis treatment. They usually create another sheet that allows them to record the patients' names and all of the patient's medication requirements. Then, when the patients all arrive in a short span of time for dialysis, they can simply go to their summary sheet, flip through the list by patient name, and copy down the medications that are needed for that patient's dialysis. This saves them the time that would be required to pull out each patient's chart, flip to the medication section, write down the necessary information, replace the chart and then continue for the rest of the patients currently being treated. They then go to the medication cabinet and retrieve the required medication for their patients at one time. While at the medication cabinet, they record on another sheet the same information pertaining to which patient is getting what medication. The nurses also record on the treatment record the name of the medication and the time the medication was administered to the patient. The treatment record is used for many purposes, including for billing. From this treatment sheet, often another summary sheet of administered medications is created for billing purposes, for restocking the medication cabinet, for verifying the current inventory and for cross checking to ensure that the amount of medication administered equals the amount of inventory that decreased during the day.

Another example of multiple or alternative databases that exists is exemplified by the use of the current dialysis machines. These machines have indicators or viewing screens on them. These screens or indicators show such information as the patient's pulse, their blood pressure, the blood and dialyate flow rate and other relevant information. This equipment can also store and present these information measures during the course of dialysis for trend line analysis based upon the time interval that the nurse or physician sets the dialysis machine to record that information. However, once that patient has completed dialysis and the machine is set up for the next patient, all of the information is lost or erased, unless it is captured in an electronic or manual format. In a manual information dialysis clinic, the nurses would generally record these measures on a treatment sheet during dialysis. They may then go to the patient's chart and re-record some of that same information in the summary sheets, such as blood pressure trends and weight gains/losses. Even if the dialysis machine information is captured in an electronic format, the usual result is to print off the information so that the printed treatment record can be inserted into the chart, and the nurses still record blood pressure trends and weight information into a summary sheet.

In short, there are many other "work-around" subsystems that the physicians, nurses, technicians and clerks have developed in order to cope with inadequate information systems and tremendous quantities of paperwork while trying to treat the patient and maintain profitability. Manual information systems are functional, and prevalent, even though they are no longer the most efficient means of capturing the data and presenting it in a user friendly way, given the advent of computer systems along with the current database technology and software. As a result, there has been a growing trend in the health care industry, amongst others, to create and utilize some form of an electronic Information Management System (IMS) to replace the manually created files. There are many IMS applications in the health care industry today, with varied levels of acceptance and success. These systems generally have a centralized database for all of a patient's information. The current methods and approaches to creating the centralized database is based primarily on having an accurate and reliable medical/legal record for billing and legal concerns along with the patient's medical information, rather than on improving and streamlining work flows and communication among health care workers.

In a dialysis clinic, like the majority of all businesses, there are a variety of workers, all at different skill levels and pay levels. There will be an attending Physician at maybe $200.00 per hour, an Administrator at $70.00 per hour, Registered Nurses at $45.00 per hour, Technicians at $25.00 per hour and a clerk or receptionist at $10.00 or $12.00 per hour. In the dialysis clinic, one of the primary roles of the nurses, technicians and receptionists is to provide the physician with the information they need, accurately, and in the way the physician needs it for diagnostic and treatment purposes. Similarly, the nurses need essential information to properly provide patient care. In a manual information dialysis clinic, the physician, the administrator, the nurses, the technicians and the clerks would gather all of the information appropriate to their level of responsibility and skill. In order to provide effective patient care while still trying to be cost efficient and productive, each clinic will have developed and assigned the data collection and recordation process and systems in a manner that they believe will be most effective and efficient. In general, the clinics try to have the data collection and recordation done at the lowest possible cost level while still assuring accuracy and completeness of information. These data collection and recordation systems vary from clinic to clinic based upon the resources and perceived needs of the clinic and the clinic's employees.

When a physician visits the patients, they review the information in the patient's chart, evaluate the patient, write down the appropriate changes/prescriptions deemed necessary to improve the patient's treatment on an order sheet in the chart and then continue on to the next patient. All of the changes are then recorded into various areas in the patient's chart as well as the multiple other summary sheets scattered across the dialysis clinic. This maximizes the use of the physician's time to visit and treat patients. However, sometimes errors are made in the transcription of the information into various places. These errors are a potential risk for serious problems. Additionally, it is inefficient to manually write the same information in multiple paper formats.

As computers became more readily available and useful in industry and business, more efforts began to develop a useful and functional electronic IMS in order to improve productivity, lower costs and reduce errors. To better understand the process and method of creating and using an electronic IMS, it is helpful to continue with our use of the dialysis clinic as an example. In the new technology environment (i.e. computers), many improvements were made over the manual method of collecting and formatting information. For example, today, the dialysis machines have electrical connection ports through which data can either be passed directly to a printer and/or send to a centralized data collection and compilation computer. If the information from the dialysis machine is printed off, it is a simple matter to place it in the patient's chart without having to transcribe it. Although these methods offer some advantages in reducing the data collection costs and in assuring the accuracy of some of the recorded data, they still present problems in their inability to become fully integrated with the multiple systems of information management utilized within a given clinic. As another example, Physicians can now carry a hand held computer from which they can enter prescriptions and have them immediately faxed or emailed to a pharmacy, while at the same time, the prescription and dosages gets captured in the centralized database for record keeping purposes. This is an effective and accurate means for collecting patient data and having it stored centrally. However, this method requires a significant upfront capital investment and it does not necessarily allow for the integration of the information into the multiple systems of information management.

For all of the advantages of the existing IMS structures, there are still many drawbacks to the current IMS technology structures. To begin with, the development of most IMS structures has been concerned with capturing all of the information electronically and storing it in a centralized location. The focus has been on assuring accurate information and on creating a comprehensive medical and treatment record for billing and legal reasons. While some of the information is easily captured in an electronic format, such as the monitored measurements from the dialysis machine, not all of the information is as easily gathered. For example, the nurse's preliminary examination of the patient's current status is still manually gathered. To accurately put this information into an electronic format, the attending nurse often first writes the information down on paper. He or she must then log in to a computer, travel through menus to find the right patient's chart, travel to submenus to find the correct section or form, enter the data and then log out of the system. Due to the rapid pace of patient care in the dialysis clinic, many times the nurses' first capture their notes manually and then enter their notes at the end of the shift/day. This is obviously time consuming, redundant and lowers productivity and reduces the cost effectiveness.

As another example, in the primarily manual scenario, as the attending physician goes about their rounds visiting patient, they do not need to interact with a computer. After their review of a patient's record and an examination, the attending physician may have some additional comments, notes and/or new prescriptions that need to be placed in the patient's file. Typically, the physician would simply jot this information down in the patient's chart and/or write up a prescription. The physician would then move on to see the next patient while a clerk or technician would record this information into various other forms and paper or electronic databases. With the current IMS protocols and in order to assure accuracy for the medical/legal record, the physician is required to log in to a computer, navigate through menus to find the patients file and the proper form, enter the additional data into the computer and then log off the data entry computer. Given that this data entry used to be done by the lower level and lower cost employees, we now have data entry at the highest level and highest cost. In addition, by using the physician's time to do data entry, the physician is no longer able to see and treat as many patients as they did before. Therefore, the physician's number-of-patients per physician-hour ratio goes down. Productivity is lost at the highest cost level and the data entry is now at the highest cost. This is not the best way to improve productivity or reduce costs. A host of other similar inefficiencies have resulted for the physicians, nurses, administrators, technicians and clerks as a result of the existing efforts to provide an IMS structure.

Medical treatment facilities are more interested in providing care for patients and less interested in the storage and retrieval of information, and they have a comfort level with the existing information systems. Electronic Information Management System companies appear to be more interested in the storage and retrieval of data than in how the users need to make use of that information. To move to an electronic IMS, many of a clinic's old manual sub-systems for accurately and efficiently collecting and recording patient information have to be redesigned and re-structured in order to accommodate the new electronic IMS structures. In most cases these redesigns have resulted in additional work at a higher cost level than before. In addition, they typically have not added any additional information to the patients' files. As health care workers are smart consumers of technology, they have resisted implementing technology that does not: (1) improve their speed and productivity, (2) make their jobs less complicated or complex, or (3) make their tasks more convenient. Consequently, many medical professionals resist solutions that require them to restructure how information flows within a medical center or clinic because current solutions do not meet the above criteria. Physicians particularly resist them as the new systems require them to enter the information within the medical center or clinic.

While medical centers and clinics may have some computerization of portions of data collection, storage, and reporting, the majority lack an automated integrated system. The area that has most consistently been computerized is the billing arena. However, even in billing, there is still heavy reliance on handwritten forms and paper databases, which produces inefficiencies and redundancies. As a result, after initial gains, costs have gone up and productivity has gone down. As such, the need for a new method and means for creating an electronic Information Management System that is cost effective, improves the productivity of the users, provides accurate information for medical and legal purposes and is user friendly has developed, particularly in the medical profession.

Due to health and economic pressures from the government, healthcare insurers, businesses and the public, there has also developed the need for health care providers to search for better ways to provide patient care at lower costs. This is forcing the health care facilities, and other businesses, to look across facilities and industries to find Best Practices. Finding Best Practices has turned out to be harder than anticipated for a variety of reasons. Some of those reasons include the lack of integrated systems, patient/physician confidentiality and, to some extent, the protection of patient information provided in the Health Insurance Portability and Accountability Act (HIPAA). A system which contains pertinent de-identified data could be utilized to provide benchmarks, though various media, that would allow a clinic or groups of clinics to compare their performance across a wide spectrum of similar businesses in order to improve business practices while maintaining patient information confidentiality.

In summary, there are clear, documented problems with the current ways that information is tracked. This is true for those clinics that are primarily manual as well as for those clinics that have attempted to migrate into a primary electronic format. Just as clear are all of the potential benefits from having access to electronic information. The current concepts for information management surround the idea of a paperless office. Despite all the promises and potential value such a situation would deliver, there remain many obstacles to achieving that goal. These obstacles include both the technical and cultural obstacles. Rather than insisting on a paperless IMS to achieve these goals as the only solution, there is another alternative. Rather than focusing on an electronic IMS as being the medical record, the IMS can and should focus on improving communications among health care workers and streamlining business practices and information flows.

SUMMARY OF THE INVENTION

This disclosure describes a system and the methods for improving the performance of a business. Briefly described in architecture, the system includes a combination of manual and electronic means for gathering data from a plurality of sources, storing identified and de-identified information in a plurality of databases that are both manual and/or electronic, a flexible rules processor that collates and formats specific electronic information in the electronic databases based upon user defined criteria, and a variety of means for creating electronic or manual outputs based upon user requirements.

This disclosure also describes a method for analyzing the business processes relative to the gathering, storing and outputting of data and information in such a manner as to improve a business' productivity, costs, performance and organization. In this regard, the method can be broadly summarized by the following steps: (1) identify and categorize all of the data types and information flows in the current business processes including the current and alternate methods of data capture, (2) identify all of the data and information outputs that the users require and the optional means of creating said output, and (3) restructuring the business processes and systems involved in the activity of data collection, storage and output in order to improve the performance of the business.

Another method described in this disclosure relates to the methods for gathering, storing and outputting a plurality of operational data obtained from a plurality of separate business entities. This method can be broadly summarized by the following steps: (1) gathering specified manual and/or electronic data at a given location to an electronic local data repository and/or to a manual data repository, (2) periodically duplicating the electronic data in the electronic local data repository to an electronic offsite association data repository, (3) de-identifying the data in the all of the offsite association data repositories and storing the combined de-identified data in the electronic central data repository, (4) creating a user specific set of rules for use in a flexible rules processor that defines the data outputs and formats, and (5) providing a user flexible choice in the means for displaying the various outputs.

Other features and advantages of this disclosure will become apparent to one skilled in the art upon examination of the following drawings and detailed description. It is intended that all such additional features and advantages be included within the scope of the present invention.

BRIEF DESCRIPTION OF THE DRAWINGS

A system and a method according to the invention will be described in more detail by means of a preferred embodiment with reference to the appended drawings in which:

FIG. 5 illustrates a second sample output report that allows for the presentation of electronically stored data and for the capture of manual data;

DETAILED DESCRIPTION OF THE PREFERRED EMBODIMENTS

To facilitate the description of the invention, it is worthwhile to define some terminology solely for this purpose. This terminology is somewhat arbitrary and should not be construed as limiting the generality of the invention. For the purpose of this description:
1) Association is meant to be understood as a business entity. Such an entity could be a single business, or it could be a group of businesses all owned by the same single business entity.
2) Association data repository represents the electronic data and information belonging to a specific business entity.
3) Data repository means an electronic collection of data and information that may be stored on one computer or stored on multiple computers, all networked together.
4) Inputs and interfaces include any available manual or technological means for entering data into the data repositories.
5) Software programs and/or applets are meant to include any software program or portions of a software program utilized by the Information Management System (IMS).
6) Patient chart or chart refers to a manual compilation of a specific patient's medical records.
7) Internet Information Server or IIS is meant to refer to any controller or computer that contains software programs or applets used in conjunction with the other electronic equipment, software and/or databases. This can include embedded web server and web services.

Reference will now be made in detail to the description of the invention as illustrated in the drawings. Although the invention is described in connection with the drawings, there is no intent to limit the invention to the embodiment or embodiments disclosed therein. On the contrary, the intent is to include all alternatives, modifications, and equivalents included within the scope and spirit of the invention as defined by the appended claims. In addition, to aid in the description of the invention, the health care industry, and specifically the dialysis clinic operations, have been utilized to aid in the understanding of the invention. However, the invention and its alternatives, modifications, derivatives and/or equivalents in other applications are meant to be included within the scope and spirit of the invention as defined by the appended claims.

Figure 1:
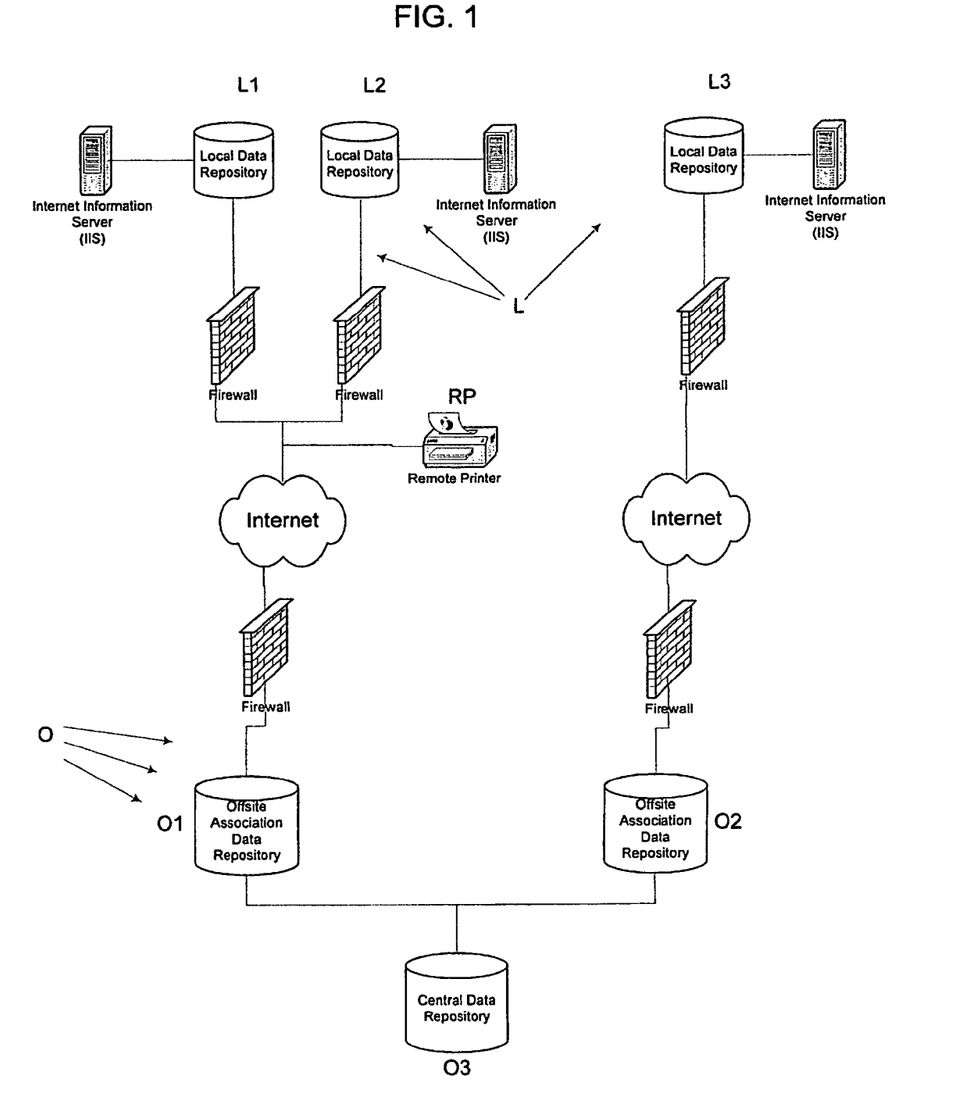
FIG. 1 illustrates the overall topology of the local and offsite data repositories.

FIG. 1 is a block diagram illustrating a computer connection topology. The arrangement show in FIG. 1 comprises two main sections, a local data repository L, and an offsite data repository O, each with their own separate data and information and with firewalls into and out of their networks. The three local data repositories in FIG. 1 labeled L1, L2 and L3 represent three distinctly different data repositories located at three different health care clinics. The local data repositories L1 and L2 represent the local data repositories from two health care clinics that are owned by the same association or business entity. The local data repository L3 represents a local data repository owned by a different association or business entity. The two offsite association data repositories, O1 and O2, shown in the offsite central data repository O represent two different data repositories that are located in a geographically different area from any of the local data repositories. The offsite association data repository O1 contains duplicate information from the local data repositories L1 and L2 which belong to one or more related clinics belonging to the same association. The offsite association data repository O2 contains duplicate information from the local data depository L3, which belongs to a different association or business entity. The central data repository O3 contains de-identified data and information from all of the local data depository's L1, L2 and L3 that can be utilized for investigatory work and research analysis. De-identified data is data that can not be associated back to the originating patient. De-identifying the data is a requirement under the Health Insurance Portability and Accountability Act (HIPAA), also known as the Kennedy-Kessebaum Act. Each of the local data base repositories, L1, L2, and L3, and the offsite association data base repositories, O1 and O2, has an internet information server (IIS) so that the databases can be accessed through the worldwide web. The offsite association data repositories, O1 and O2, allows authorized users to access only their association specific databases and applications through a network whether the user is at the local repository site or not. Additional site specific local data repositories, additional associations, and additional offsite association data depositories could be added to the invention without detracting from an understanding of the invention.

There is also a remote printer RP which is shown connected through the firewall to the offsite central data repository O, which is representative of an individual's printer and can be utilized for printing specialized aggregated data reports from the association data repository and/or the central data repository. There may be multiple remote printers RP connected to the offsite data repository O. The remote printer RP is representative of any printer that can be utilized to produce report outputs at the local data repository site L, at the offsite central data repository O, or at a site remote from both the local data repository L and the offsite central data repository O. The association data repository O1 or O2 can be used for disaster recovery for a specific association's local database, L1, L2, or L3.

Databases and information for a specific clinic are stored on a local data repository, such as L1. Periodically, the data is copied from the local data repositories, L and transferred to the appropriate offsite association repository O1 or O2. Data from the offsite association data repositories, O1 and O2, is periodically extracted, de-identified, and transferred to the central data repository, O3. The data and information in the offsite association data repositories O1 and O2 remain unchanged.

The configuration and connection of the different systems is apparent to anyone trained in the art of setting up database software systems and networks. The interconnection of the electronic databases may be by any conventional or state-of-the-art networking technology.

Figure 2:
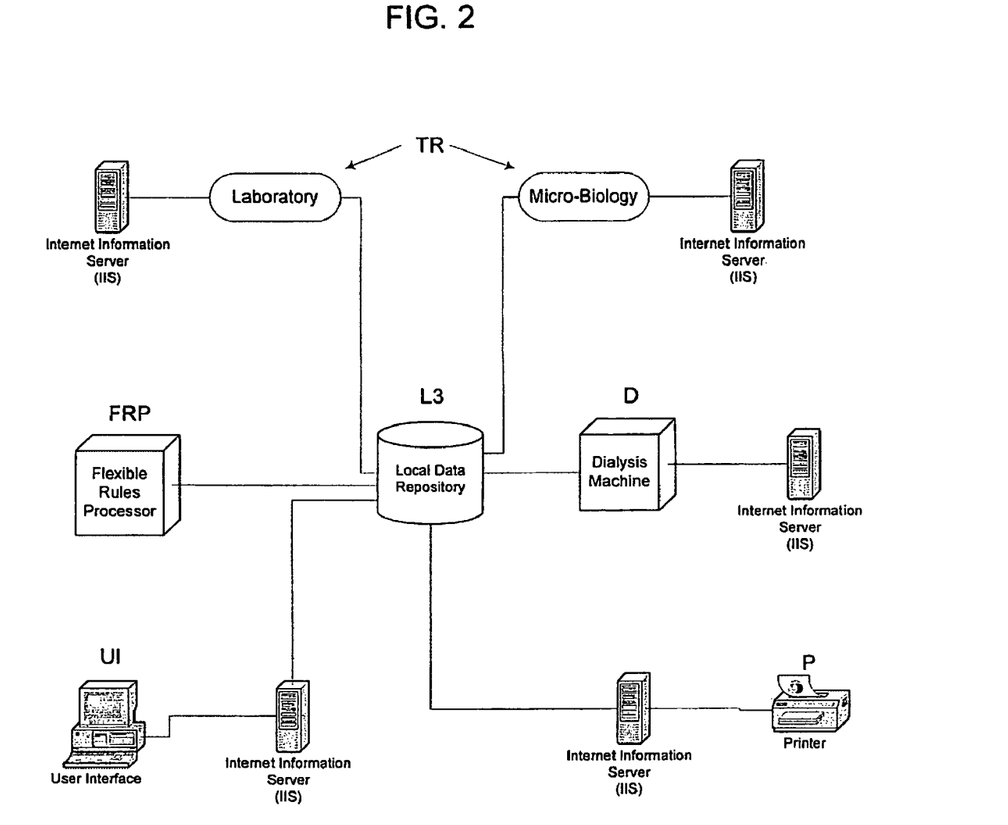
FIG. 2 illustrates the topology of a single local data repository.

In addition to connecting the local data repositories L to the offsite central data repository O, FIG. 2 shows a block diagram, in its preferred embodiment, illustrating the other typical connections to a single local data repository L3 on a local network. The connection from the local data repository L3 to the offsite data repositories O is not shown in FIG. 2 as it was already depicted in FIG. 1. The dialysis machine D that is connected to the patient (not shown) is also connected through both hardware and software interfaces to the local data repository L3 for automatic data capture and storage. The onsite or offsite laboratory and microbiology test results TR are also connected to the local data repository L3 through both hardware and software interfaces for automatic data capture and storage as well. A local user interface UI such as a keyboard and computer monitor is also connected to the local data repository L3 for the collection, storage, and/or viewing of user defined data. Onsite printers P are connected to the local data repository for the purposes of printing reports. Other types of medical equipment or data input and output devices could be added to the system shown in FIG. 2 without detracting from the purpose of capturing, storing and/or viewing information. FIG. 2 also shows a flexible rules processor FRP connected to the local data repository L3. The actual connections, shown in FIG. 2, to the local data repository L3 can be accomplished in a variety of ways including but not limited to internet and intranet access, hard wiring, and/or wireless communication.

In another embodiment of the system, the interfaces to the dialysis machine D measurements and/or the laboratory test results TR, or to other inputs, could be done with a manual user interface UI such as a keyboard and monitor.

The system also includes a variety of software programming, not shown, that allow the system to operate such that the local data repository can collect and distribute information and data relevant to the business or clinic. The internet information servers (IIS) shown in FIG. 1 and FIG. 2 contains software programs that directs the system to run the interface between the various input and output devices. For example the internet information server (IIS), shown attached to the manufacturer's dialysis machine D in FIG. 2, contains the software programs that directs the system to run the interface between the dialysis machine D and the local data repository L3. There are other software programs to operate the interfaces that go between the data input and output methods and the local data repository L3. For example, FIG. 2 depicts the Internet Information Server (IIS) interface directing the transfer of data and information from the microbiology laboratories and the other laboratories TR to the local data repository L3. FIG. 2 also shows the transfer of data from the manual user interface UI, using the Internet Information Server (IIS) software or applets, to the local data repository L3. FIG. 1 depicts the use of the Internet Information Server (IIS) software or applets in the process of directing the extract process that transfers data between the local data repository L3 and the offsite association data repository O2.

The manual user interface UI in FIG. 2 has a variety of software programs, or applets, for the collection and storage of information into the local data repository L3 as well as for the display of information from the local data depository L3. For example, there is a basic patient information software program that provides for the input of such items as the patient's name, social security number, address and telephone number, health care insurer and so on. There is another software program, or applet, for scheduling patients and/or the staff or other business personnel. There is another software program or applet for tracking the use of medication and the medication inventory. All of these software programs, and many more, are designed to easily and efficiently collect and store the medical information that is either deemed relevant for medical treatment purposes, for billing and inventory purposes or for regulation and/or legal requirements. The method of how the information is being collected locally and then combined with paper and electronic databases through the use of the local data depositories L, the association data repositories O1 and O2 and the central data depository O3 is new to the art.

Figure 7:
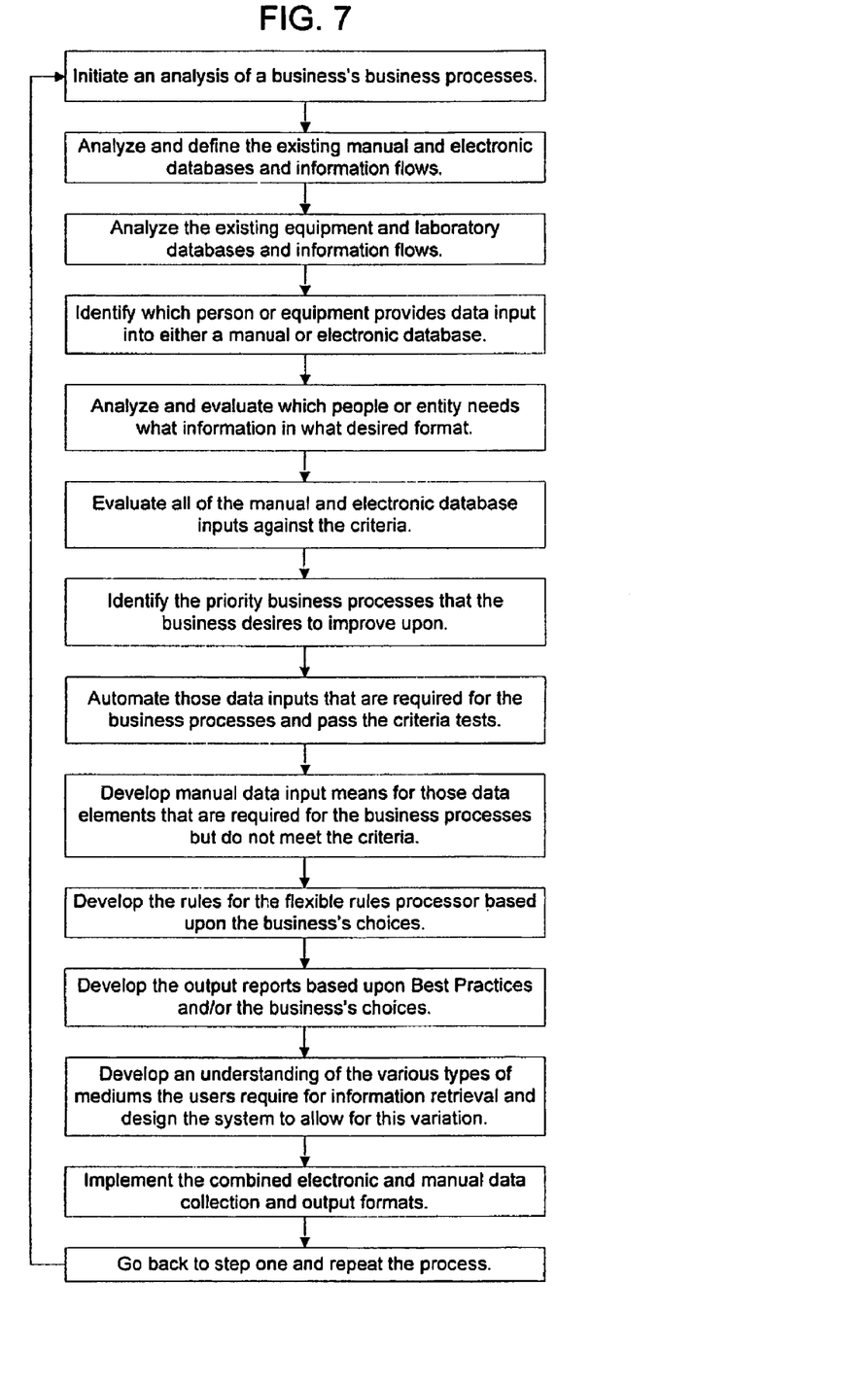
FIG. 7 illustrates the steps for analyzing, evaluating, and selecting the types and means for capturing, storing and outputting data and information for improving productivity.

The actual use and implementation of the above described system by an individual business or clinic is determined by the individual business' or clinic's existing business processes and the desire to improve those processes to reduce costs and improve productivity and profitability. The improved business process begins with an analysis of a specific dialysis clinic's existing business processes, including database and information flows. FIG. 7 shows the flow diagram of the basic steps used in the business process analysis method. The method shown in FIG. 7 begins with an analysis and definition of the existing business process data bases and information flows. The analysis then looks at the type of equipment and the laboratory results that are currently being used and their information interface into the IMS. Typically, all of the medical equipment and the laboratories have the capability of providing their data and information passed electronically to the clinic's IMS through a software applet or interface. The data and information flow analysis also includes defining which individuals in the clinic provide which type of manual or other inputs to the existing IMS. This is necessitated due to the fact the every dialysis clinic has developed and adopted its own site specific methods and means for collecting, recording and outputting relevant information in order to operate the dialysis clinic in a medical and cost effective means. As a general statement, the attending physicians currently have in front of them the information necessary to effectively treat the patients. However, from a productivity and cost improvement viewpoint, the issue is in determining which individuals have to go through what kinds of data transcription and multiple copying in order to provide the physician all of the relevant information in the format the physician requires, or to do their own jobs efficiently.

Once the data elements have been identified, the business process analysis method FIG. 7 then identifies which individuals and/or equipment provides data input, either manually or electronically, into the existing databases. After this step, an analysis is done to determine which individuals and/or entities require which information and the format that they want the information in. Once this analysis has been accomplished, all of the information is evaluated against specified criteria to determine which data inputs and outputs should be automated electronically and which data inputs and outputs should be left to be done manually. Some of these criteria used to make this evaluation may include assuring that any changes proposed to the existing business processes: (1) provides the same or more valuable information to the user and/or the business, (2) improves the productivity of the people using the business process, (3) reduces the cost of doing business while complying with all applicable rules and regulations, and/or (4) imposes the least amount of disruption to the existing business processes. Other criteria can be added or deleted to this evaluation process as required or desired.

After this evaluation is completed, the next step in FIG. 7 is to identify the priority business processes that pass the criteria test and that the business desires to implement first. Once that is decided, the process then begins the automation of the selected data inputs and outputs that passed the criteria testing and was selected by the business as their highest priorities. This evaluation and analysis determines which elements can be easily and economically automated and which cannot. The data that can be cost effectively automated is then automated. Following this, those data inputs and outputs that were determined to be kept in a manual format are reviewed and modified to capture and report on, in the most productive and economical manner given the business' capabilities and resources. For those data elements that cannot be cost effectively automated, a means for manually collecting the information is developed that provides a simple interface with the IMS that is technically easy to use. An analysis of which individual's input of data is then done in order to develop the data interfaces for the clinic that will have the least amount of disruption on the current business processes that the clinic or business personnel are using. Then, based upon the business', physician's and/or clinic's choices, the definitions and rules for the flexible rules processor FRP shown in FIG. 2 is developed and defined, on a business by business or clinic by clinic basis, for producing outputs that maximize the end results and minimize the overall costs. Next the output reports are reviewed and modified based upon the business' decisions and/or Best Practices that have been developed or discovered up to that point in time. These business process improvements and changes are then used to improve the performance of the business and the business results achieved. After the changes are implemented within the organization, the method for business process improvement analysis begins all over again.

Figure 3:
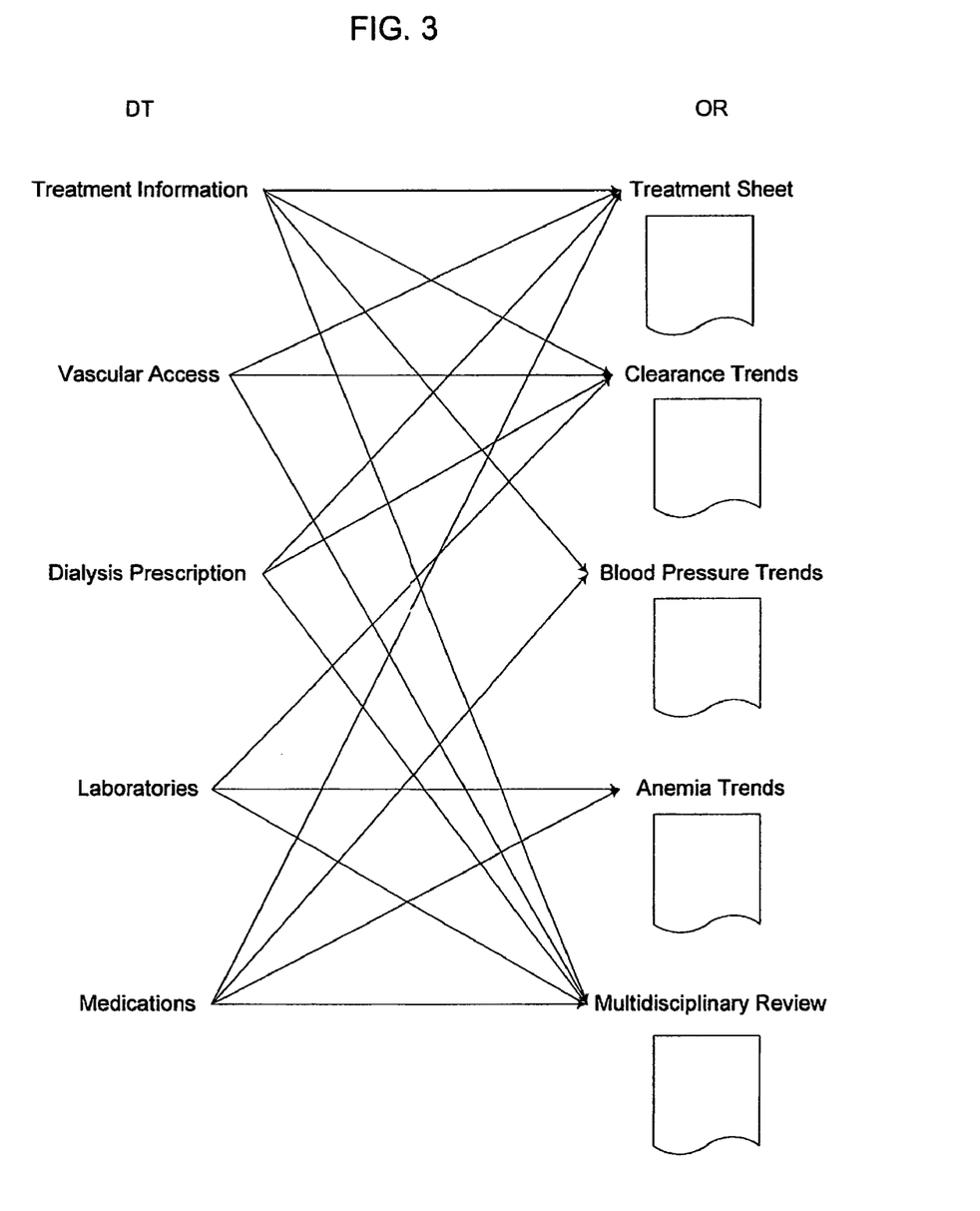
FIG. 3 provides a graphical depiction of some of the various data types and the types of output reports that use portions of those data types.

FIG. 3 provides an example, although not the only one available, of some of the information or data types DT that a dialysis clinic may find useful and some of the differing output reports OR that can be generated, either physically or through electronic means, that would be useful for patient care and for improving the productivity and cost effectiveness of the clinic. The solid lines between the data types DT and the output reports OR indicate where portions of the electronic data would be useful for patient treatment and/or clinic productivity improvement. For example, as can be seen in FIG. 3, a portion of the data type DT Treatment Information would be useful in four of the output reports OR. These four output reports OR include the Treatment Sheet, the Clearance Trends, the Blood Pressure Trends and the Multidisciplinary Review outputs. What is important to recognize in this schematic is that none of the data types DT or discrete data elements is mandated or presupposed to be collected and stored electronically. Rather, the choice of electronic or manual data collection and storage is based upon the determination of which data is best collected and stored electronically, and which is best collected and stored manually given current technology and the individual clinic's business practices. This determination varies from business to business and from clinic to clinic and over time.

Once an understanding of the current database and information flows is established, the business process analysis, FIG. 7, continues by developing a through understanding of which individuals require information output from the existing IMS and the format of how that information is required, in all of its different uses. The output is predominantly automated. Presently, in most clinical applications of an electronic IMS, the outputs are all electronic, meaning that a user has to find an electronic medium to view the data and available patient information. There is very little flexibility in these systems today. The proposed system outputs are flexible and based upon the idea that the outputs need to be presented in whatever format and medium that is convenient at the time, for the person who needs to view the information. For example, if the physician is away from the clinic, it is more convenient for the physician to use the internet to access a patient's database than to travel to the clinic to view the patient's file. Conversely, if the physician is at the clinic, it is more convenient for the physician to look at the patient's paper file, or chart, than it is to log onto the computer to access the relevant information. As such, the outputs from the proposed system are kept both electronically and printed out for keeping in the patient's file. In addition, the printed outputs are designed with the concept of providing user specific data output along with available space for user defined data gathering and recordation. This allowance for data collection and recordation on the printed outputs simplifies and improves upon the entire business or clinic IMS process and system while improving productivity, cost effectiveness and maintaining the medical/legal record.

The output information and formats can vary from clinic to clinic or business to business. To accomplish this, the proposed system has a flexible rules processor FRP shown in FIG. 2 that allows each clinic to determine which information needs to be retrieved from the data repositories and presented together to allow for better patient diagnosis and treatment and for improved productivity of the clinic staff. In addition, clinic preferences allow for customization of both the electronic information gathering forms and the outputs for both information presentation and gathering. For example, in a dialysis clinic there are many laboratory tests that are run on a patient's blood to measure the current status of the patient. For a person who is not on dialysis, the results of those tests will be one range of numbers. For a person whose kidneys have stopped functioning and requires dialysis, the test results will fall in a very different range for the same measures. As such, the laboratory doing the tests will view the resulting dialysis patient's numbers as abnormal, whereas the dialysis clinic will view the numbers as normal for a patient on dialysis. It is only when the dialysis patient's medical numbers go outside of the range of measures that is normal for a dialysis patient that the attending physician gets concerned and takes action. In addition, each clinic and physician may have a different view as to when they want to have the dialysis patient's abnormal test measures show up for attention and/or action. One clinic may want to know when a patient's numbers are getting close to becoming abnormal while a different clinic may only want to view the measures once the patient's numbers have exceeded the threshold, and are now truly abnormal for a dialysis patient. Each clinic can decide upon its own rules for when it wants the information and data presented to the clinic personnel for attention. The flexible rules processor can be modified and changed over time based upon a given clinic's need for changes or improvements in what information is being presented and the manner of presenting that information. Furthermore, the information that is presented in either electronic or manual form can be altered based upon preferences determined by the individual clinic.

The actual rules are determined by several factors. Those factors may include, but are not limited by, such things as what the physician wants to see presented based upon their individual knowledge and experience, what is required for the care of the patient, and what measures the Medicare Network (Network) requires the clinic to monitor and report upon. As such, the rules processor is can be categorized by such items as individual patient, by physician preferences, by clinic requirements and by Network requirements. This allows the physician to set and modify individual health goals as well as provide overall measures and reports for the clinic and the Network. On an individual patient basis, this allows the attending physician to preset treatment changes for individual patients based upon the results of their various tests and procedures.

In addition, since the proposed system is designed to enhance communication, rather than be a fully electronic medical record, the printed output reports OR are designed to suit the clinics' business processes. For example, if a nurse gets a printout of a patient's record, the nurse, or other authorized clinic employee, can write down additional notes on the printed report and file it into the patient's file or chart (the permanent medical record) if the clinic determines that method to be the most effective and cost efficient means to capture and record the information. Therefore, based upon the clinic's decisions, the redundant parts of the patient's record that are prepared ahead of time are captured automatically and the other comments are recorded manually on the printed out sheet and stored in the patient's permanent record. The medical/legal record is kept intact, the electronic data collection and outputs are designed for enhanced communication, which improves productivity, reduces cost, and preserves the medical record in the most effective manner whether it is electronic or manual. This same business method approach is applied to all of the other areas of the clinic staff in addition to the nurses.

Figure 4:
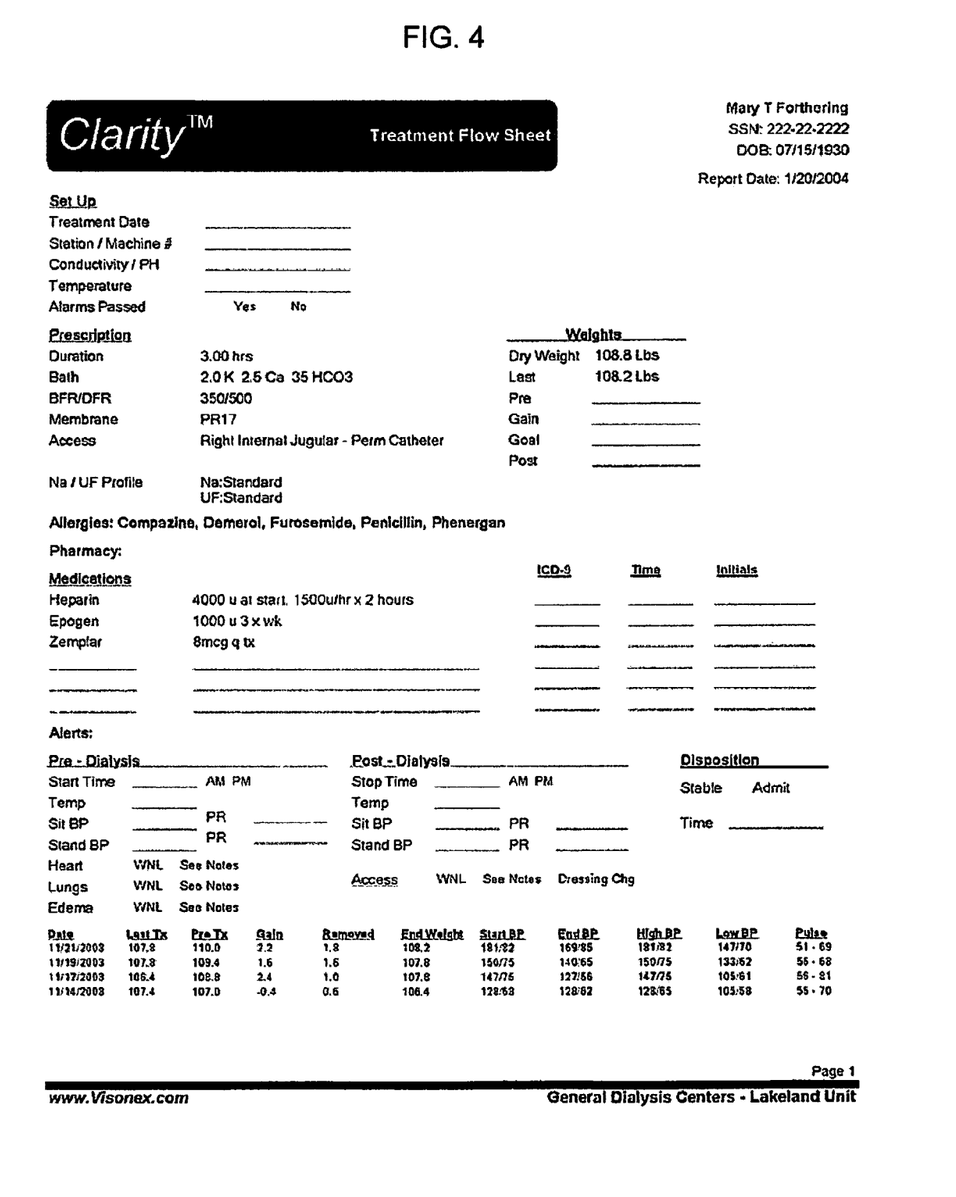
FIG. 4 illustrates a sample output report that allows for the presentation of electronically stored data and for the capture of manual data.

Some examples of printed outputs that provides for both electronic and manual information data collection and presentation and shown in FIG. 4 and FIG. 5. FIG. 4 shows a sample Treatment Sheet for a make-believe patient. In the top right hand corner of the Treatment Sheet are some basic static electronic information about the patient that was preprinted on the output report, including the patient's name, social security number, date of birth (DOB) and the report date. Under the heading of Set Up there are five categories with open spaces next to them which would be manually filled in by a clinic employee. These manual inputs include the treatment date, the station/Machine #, the conductivity/PH, the temperature and the alarms passed. As one goes down the remainder of the output sheet, one will see various output areas that have been automatically filled in with electronically collected and stored data, and areas where there is space for the manual entry of data. The choice of what should be electronically collected, stored and reproduced, and what should be done manually is dependent upon current technology, current business practices of the clinic and current requirements for information collection as part of the permanent medical record.

FIG. 5 shows an example of a Multidisciplinary Report that includes both electronically gathered and retrieved data and places for manually entered data. The summary information, in this example, is all gathered and reproduced electronically. The data under the subtitle Systematic Review contains both electronically gathered information and areas for manual data gathering and storage.

After a through understanding of the clinic's existing business processes, the next step in the method shown in FIG. 7 is an analysis to determine which existing business processes, within the clinic IMS system, could be changed or modified such that the change: (1) provides the same or more valuable information for the user and/or the business, (2) improves the productivity of the people using the business process, (3) reduces the cost of doing business while complying with all applicable rules and regulations, and (4) imposes the least amount of disruption to the existing business processes.

The analysis also includes determining which existing business processes should not be changed, or changed very little, in order to avoid increasing costs, reducing productivity or disrupting the existing business process. For example, during their rounds with the patients, the nurses make a variety of notes about the patient and their condition or treatment. In the fully electronic IMS, this would require the nurses to log onto a computer and enter all of the nurse's notes into the electronic database. This process decreases the nurse's productivity and increases clinic costs. In addition, the nurse's notes are rarely viewed or utilized except as a medical/legal record of care. They are not typically used in reporting. As such, the proposed IMS is flexible in that it prints out the automated information that is required and leaves available space for the nurses to write down their notes manually so that once the paper is filed in the patient's chart or folder, the patient record is complete and the existing productivity is maintained or improved while costs are contained or decreased. As technology improves, the proposed invention will take into account the best manner to record this information and be incrementally altered to take advantage of improvements in technology to allow for continuous improvements in productivity aligned and matched with the improvements in technology.

Since the equipment and how people are assigned to collect and record data vary greatly from clinic to clinic, the actual results of this analysis will vary greatly as well. However, the method for determining this result is the same each time. The method is to evaluate each business process based upon the criteria listed above, or upon other criteria as defined by the business needs or directives, and to arrive at a decision on how best to collect and record the relevant information consistent with those criteria. As a comparison, most IMS companies today have already developed a fairly rigid IMS structure and format. Typically, a business or clinic that desires to install a computerized IMS quickly finds that their existing data collection and recordation processes are not consistent with the IMS structure. This is usually true because the IMS software company is interested in collecting all of the information electronically in order to provide a business or medical/legal record similar to an event log. As a result, the business or clinic employees are forced to modify their current practices in order to fit their activities in with the IMS structure. The new business method invention takes a substantially different approach. The new business method invention looks at the existing structure and then develops a flexible IMS structure that fulfills the business and/or health care requirements, minimizes the amount of business practices that needs to be changed and reduces costs. The new IMS does not attempt to become a fully electronic medical/legal record or event log. Instead, it tries to become a means for improving communication among the health care team by providing relevant information for treatment and reporting, and as a productivity, organization and cost improvement tool.

This is not to say that all information must be gathered electronically, but that information that is currently best suited to be electronic is determined by the four criteria of: (1) providing the same or more valuable information for the user and/or the business, (2) improving the productivity of the people using the business process, (3) reducing the cost of doing business while complying with all applicable rules and regulations, and (4) imposing the least amount of disruption to the existing business processes.

However, as each business or clinic varies in their methods and business process, it is necessary that each business or clinic be evaluated and determinations made as to which data and information is to be gathered electronically and which data and information is to be entered manually. In addition, each clinic must also decide which personnel are to be responsible for the gathering and collection of manual data and in what format the data is to be gathered and recorded.

Once the new IMS structure and implementation plan has been developed with the business or clinic, the installation begins in a series of incremental steps. As the clinic personnel gradually change over their business processes where it makes both medical and economical sense, they start gaining the efficiencies and productivity enhancements that improve the business' profitability. In addition, once certain information becomes resident in the IMS data base, new features and enhancements become available automatically. For example, in a clinic today, in order to do a proper assessment and treatment a physician must completely review a single patient's chart in order to determine which relevant medical measures and conditions are present and abnormal that requires treatment, and which conditions and measures are not abnormal. Once the relevant data is in the IMS structure, the new IMS can develop and print out the patient's relevant abnormal measures and conditions based upon a set of analysis rules built into the flexible rules processor FRP shown in FIG. 2. The new report would identify those medical conditions that are significant to a patient's treatment and well being, and leave off the information that was not relevant for the patient's treatment. For example, in treating a dialysis patient it is important to know such things as if the patient has anemia, or if they are diabetic, or if they have high blood pressure or suffer any number of other conditions or maladies. As such, in visiting a patient, the physician no longer has to physically go through the patient's entire file to find the relevant information, but merely look at the top printout of that patient's file to determine all of the relevant abnormal information required to diagnosis and treat the patient. For example, the top sheet, produced from the local data repository L3 onto the local printer P shown in FIG. 2 by software or applet, could list if the patient was diabetic, had high blood pressure and suffers from anemia. If different patient did not have diabetes but did suffer from high blood pressure and anemia, the top sheet would only list high blood pressure and anemia as the medical issues for that patient. This method of reporting greatly improves the physician's diagnosis by making sure that all of the patient's important abnormal data and information was being presented to the physician and that none of the pertinent information, based upon the rules, was missing or overlooked. It also improves the physicians productivity by allowing them to focus their time on diagnosing and treating the patient instead of spending time to search through the patient's chart to try and locate all of the relevant information and data. This tool is not meant to provide diagnosis or suggest treatment, but rather to gather information in a way that is least disruptive to the business or clinic so that as much pertinent information as possible is available for the physician to review, while limiting non-pertinent information. Nor is this tool meant to replace physician review of a patient's chart, but rather to allow the physician to focus their attention on issues that need to be acted upon.

Figure 6:
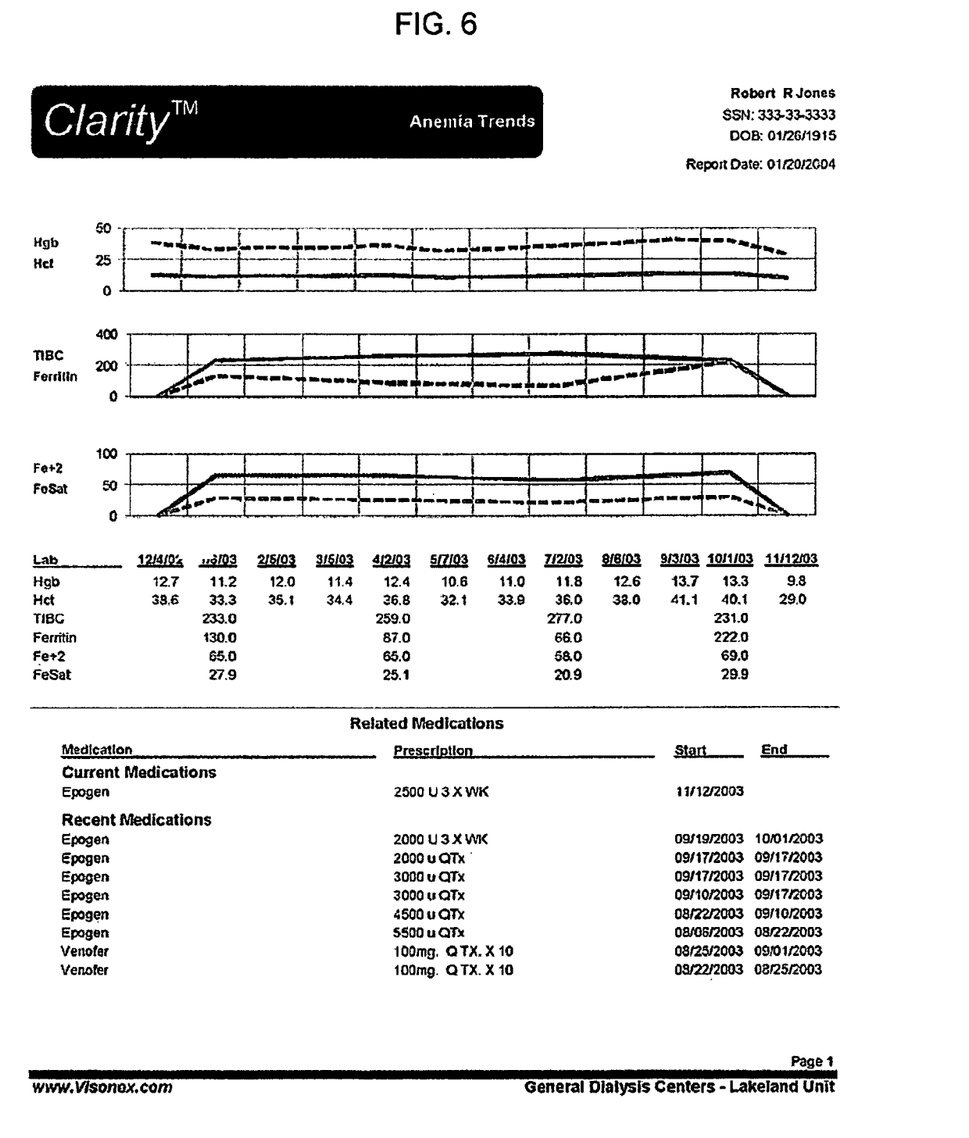
FIG. 6 illustrates a third sample output report that allows for the presentation of electronically captured data in both a spreadsheet format and in a graphical format.

The information provided to the physician, and others, can also be provided in multiple formats at the same time. For example, in addition to providing a patient's laboratory results on hemoglobin in the blood stream for the past six to twelve laboratory tests, the report can also provide a graphical display of the hemoglobin measures such that the attending physician can look at the graph, instead of the numbers, in order to identify trends. The same report can also have included with it the patient's blood iron level and/or other abnormalities in any of the measures, as well as the medications the patient is on and other relevant information, all on the same sheet of paper or electronic medium. An example of this is depicted in FIG. 6, the Anemia Trends output report. As can be seen in FIG. 6, the Anemia Trends output report includes the patient's static information such as their name, social security number, date of birth (DOB) and the report date. The output sheet also provides a graphic display of the patient's levels of hemoglobin (Hgb) over time, and two other graphic trend charts related to anemia. Beneath the trend charts are listed the laboratory test results for the same period of time that is presented in the charts. Beneath that are listed the current and recent medications that the patient is, or has been, on. Of significance is that this output report is completely electronic in nature, whereas in FIG. 4 and FIG. 5 the reports included both electronic information and manually included information. Once again, the choice of what is presented on paper or electronically is left entirely to the end user.

At the clinic level, the system can also automatically track and provide exception reports on those patients in the clinic with low hemoglobin levels that are taking the relevant medication, how much medication they are consuming and the both the total amount of medication being consumed at the clinic and the related improvements to hemoglobin levels. Thus the system can automatically generate patient specific reports as well as clinic level summary reports as defined by the physician and/or the clinic through the flexible rules processor. Thus this system, through its novel application of combined manual and electronic gathering and reporting of information, is able to more easily integrate with the business systems of the clinic. Additionally, the flexible rules processor FRP allows for the generation of exception reports on a patient level basis, as well as on a clinic level basis. For example, the proposed invention will flag patients above or below a set hemoglobin level that is the same for the entire clinic and will also allow for individual patients to have individual goals that differ from the rest of the clinic.

Similar improvements to cost and accuracy of information can occur in many other areas of a clinic. For example, in a dialysis clinic, a nurse now records patient medication in multiple locations, such as the patient's chart, the patient medication quick reference chart (nurse cardex), the patient medication spreadsheet and the medication inventory log. In a traditional electronic IMS, the nurse would log into the electronic system, search through the screens to find the appropriate patient medication, often write the information down on a piece of paper, logs off the IMS, acquires the medication and distributes the medication to the patient. In the present invention, how the nurse gets the patient medication record, acquires the medication, adjusts the medication inventory and disburses the medication to the patient is determined by the clinic based upon what is both effective for the patient and is also cost effective for the clinic. With current technology, this is often in the form of a printed summary report that can be scheduled to be automatically printed prior to the start of the shift containing all relevant medications needed for the relevant scheduled patients. This means that the clinic can choose which steps in the process it wants to automate and which steps it wants to keep manual, and how to best gain productivity within their own unique business operations. Furthermore, as the clinic personnel become more skilled in the use of the new IMS, they can add greater functionality in incremental steps, based upon their own needs and desires. As a result, each clinic can gradually add features to improve both their care and treatment of patients and to improve their own organization, productivity and costs.

In developing the software for the clinic, there was an obvious need to produce a variety of reports for various and distinct stakeholders. As such, the system and processes were developed to provide reports as required by those various stakeholders. One such stakeholder is Medicare. Medicare has a list of reports that must be completed and filed regularly with the clinic's Renal Network and/or directly with Medicare. Some of those reports include the End Stage Renal Disease Death Notification, the End Stage Renal Disease Medical Information System Facility Survey, and the End Stage Renal Disease Medical Evidence Report Medicare Entitlement and/or Patient Registration. With the proposed business system and process, these reports can be created automatically and filed with the Medicare Network Center in the format Medicare mandates without additional handling by the clinic staff. Under existing IMS structures, this is not available as they are generally fixed applications established on the individual clinics computers, whereas the proposed invention is a web-based application with centralization of the data, which allows for management of the information and passage to other parties.

The attending physicians, as another stakeholder, has the ability to quickly and accurately query the data repository, either locally or remotely, and request reports based upon the criteria they are interested in viewing and/or analyzing. For example, a physician or administrator could request a list of all clinic patients that are currently suffering from anemia with a hemoglobin level below 10. Or they could request a list of all clinic patients with a low level of hemoglobin and high blood pressure, and diabetes, sorted by age. They could, in other words, select the single or multiple criteria they are interested in evaluating on a clinic basis, and have the database compile that information in a report fashion for analysis purposes. Similarly, they could request a data compilation of all of the patients receiving a specific type of medication and the relevant medical measure that relates to the use of that medication in order to evaluate the medications effectiveness or some other relevant concern. This gives the clinic all the benefits of a completely electronic medical record, but without the drawbacks and inefficiencies of a complete electronic record.

Relative to the Health Insurance Portability and Accountability Act (HIPAA), also know as the Kennedy-Kessebaum Act, the proposed system provides an equal or greater level of privacy than many of the existing electronic IMS and assures full compliance with HIPAA. Current electronic IMS allows any authorized physician to log into a given IMS, and once logged in, the physician can access any and all patient data, whether or not that physician is that patients doctor. The proposed IMS keeps track of which patients belong to which physicians. As such, the system only allows physicians to view their own patient's data, or the physician group to which they belong, but does not allow access to other physician's patient's data or information.

The proposed invention is a means for analyzing and deploying a business IMS aimed at improving productivity, costs and organization. The invention is also an IMS structure that is different from existing IMS structure in that the process of creating the IMS does not attempt to create a comprehensive electronic medical record. Rather the proposed process and IMS structure focuses on the ability to gather, store and retrieve data in an efficient and cost effective manner, improve communication and productivity without mandating how the information is to be collected and stored. The outputs and structures reinforces and improves upon the use of data in the business or clinic, rather than changing the way information is collected or used by the business or clinic. This approach does not require the physicians and nurses or other business employees to interact with the computer if they choose not to but allows for flexibility in the gathering and presentation of information. The focus of all system structures and implementation issues is driven by the business process criteria listed earlier. Furthermore, to make the business process and the Information Management System easier for the clinics to adopt, from a financial aspect, the IMS system is not sold as a capital expense to purchase the hardware, software, interfaces and periodic upgrades. Rather, the entire business process method for process analysis and improvement, along with the hardware, software, interfaces and upgrades is sold as a service on a per patient treatment basis or on a per use basis for other businesses. This is an improvement to the current method of charging a large capital outlay for the implementation of an IMS as many clinics can not afford a large capital outlay for an IMS due to current economics. By selling the business process and system as a service, the clinic has a much lower investment in the IMS and can realize the process and productivity improvements incrementally. The more the clinic or business makes use of the capabilities of the IMS, the more they realize cost savings and improvements, along with the potential for better diagnosis and treatment of patients. Thus the system provides for incremental improvements to the business based upon the business' ability and desire to add greater functionality to the IMS over time.

What is claimed is:

1. An apparatus for improving the performance, productivity, organizational and cost improvements of a health care entity, wherein said apparatus comprises:
   a. a single or a plurality of local data repositories for a given said entity;
   b. said local data repositories operatively connected to electronic databases and equipment in such a manner as to receive, collect and store electronic information from said electronic databases and said equipment;
   c. user interface devices operatively connected to said local data repositories for the input and collection of manual information and for requesting data outputs in a variety of user defined formats and output mediums;
   d. said laboratory equipment, output mediums, user interfaces and other devices operatively connected to internet information servers, said internet information servers containing software code, programs and/or applets that directs the system to run the interfaces between the various said input and output devices;

e. a flexible rules processor operatively connected to said local data repository, said flexible rules processor configured to implement computer readable code as defined by a said entity, said code configured to define the rules, wherein said rules are determined by each said user at each site, by which said data is to be gathered, collected, stored, and presented for said user and said site wherein said rules have their own site specific methods and means for each said rule and said site as defined by said users at said site for;
  i. defining the authority level(s) and accessibility of said data by said user and said site, said authority levels defining which said data a said user may access;
  ii. defining said rules for presenting data to said user or said entity and said site to include the differences in the order, amount and format by which said data is to be presented to each said user at a said site and said entity, as defined by each said user, said site and said entity; said user determined rules to include a first user being first presented with a first patient's medical data in a first order and a second user being presented with said first patient's data in a second order, a third user being presented with only the current medical data of said first patient whereas a fourth user is presented with both the historical and current records of said first patient's medical data, and a fifth user being presented with said first patient's medical data as numerical figures whereas a sixth user has said first patient's medical data presented in a graphical display, each said users output being determined by each said user's rules; and
  iii. define the rules by which any said outputs can be retrieved and/or viewed by said users and by said site, such as said first user being able to view said outputs at both a remote location through the internet and viewing said outputs locally while allowing said second user to view said outputs only locally;
f. said local data repositories operatively connected to off-site association data repositories wherein said local data repository databases are duplicated in said offsite association data repository with appropriate firewalls for security, data protection and if necessary for using said offsite association data repository for backup to said local data repository; and
g. said offsite association data repositories operatively connected to a central data repository and containing combined de-identified patient data from all of said offsite association data repositories, said combined de-identified patient data being utilized for investigatory work and research analysis, including providing benchmarks that would allow said entities to compare their performance across a wide spectrum of similar businesses in order to improve business practices while maintaining patient information confidentiality.

2. An apparatus for improving the performance, productivity, organizational and cost improvements of a health care entity, wherein said apparatus comprises:
  a. a single or a plurality of local data repositories for a given said entity;
  b. said local data repositories operatively connected to electronic databases and equipment in such a manner as to receive, collect and store electronic information from said electronic databases and said equipment;
  c. user interface devices operatively connected to said local data repositories for the input and collection of manual information and for requesting data outputs in a variety of user defined formats and output mediums;
  d. said laboratory equipment, output mediums, user interfaces and other devices operatively connected to internet information servers, said internet information servers containing software code, programs and/or applets that directs the system to run the interfaces between the various said input and output devices;
  e. a flexible rules processor operatively connected to said local data repository, said flexible rules processor configured to implement computer readable code as defined by a said entity, said code configured to define the rules, wherein said rules are determined by each said user at each site, by which said data is to be gathered, collected, stored, and presented for said user and said site wherein said rules have their own site specific methods and means for each said rule and said site as defined by said users at said site for;
    i. defining the authority level(s) and accessibility of said data by said user and said site, said authority levels defining which said data a said user may access;
    ii. defining said rules for presenting data to said user or said entity and said site to include the differences in the order, amount and format by which said data is to be presented to each said user at a said site, said site and said entity, as defined by each said user, said site and said entity; said user determined rules to include a first user being first presented with a first patient's medical data in a first order and a second user being presented with said first patient's data in a second order, a third user being presented with only the current medical data of said first patient whereas a fourth user is presented with both the historical and current records of said first patient's medical data, and a fifth user being presented with said first patient's medical data as numerical figures whereas a sixth user has said first patient's medical data presented in a graphical display, each said users output being determined by each said user's rules; and
    iii. define the rules by which any said outputs can be retrieved and/or viewed by said users and by said site, such as said first user being able to view said outputs at both a remote location through the internet and viewing said outputs locally while allowing said second user to view said outputs only locally;
  f. said local data repositories operatively connected to off-site association data repositories wherein said local data repository databases are duplicated in said off site association data repository with appropriate firewalls for security, data protection and if necessary for using said offsite association data repository for backup to said local data repository; and
  g. said offsite association data repositories operatively connected to a central data repository and containing combined de-identified patient data from all of said offsite association data repositories, said combined de-identified patient data being utilized for investigatory work and research analysis, including providing benchmarks that would allow said entities to compare their performance across a wide spectrum of similar businesses in order to improve business practices while maintaining patient information confidentiality and wherein the said offsite association data repositories may have one or more flexible rules processor(s) with the same and/or different computer readable code(s) and rules applied to the said offsite association data repositories.

3. The apparatus as recited in any one of claims 1 and 2, wherein the said apparatus usage is sold as a service on a per usage and/or per person basis.

* * * * *